United States Patent
Gombert et al.

(10) Patent No.: US 7,290,675 B2
(45) Date of Patent: Nov. 6, 2007

(54) METHOD OF MANUFACTURING A TANK OF THERMOPLASTIC MATERIAL INCLUDING A PORTION IN RELIEF FOR MOUNTING AN ATTACHMENT, AND A TANK MANUFACTURED THEREBY

(75) Inventors: Patrice Gombert, Compiegne (FR); Alexis Rosseel, Compiegne (FR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 9 days.

(21) Appl. No.: 09/824,051

(22) Filed: Apr. 3, 2001

(65) Prior Publication Data

US 2002/0043533 A1  Apr. 18, 2002

(30) Foreign Application Priority Data

Apr. 3, 2000 (FR) .................................. 00 04219

(51) Int. Cl.
*B65D 25/02* (2006.01)
(52) U.S. Cl. ..................................................... 220/562
(58) Field of Classification Search ................ 220/562, 220/563, 564; 264/503, 512, 516
See application file for complete search history.

(56) References Cited

U.S. PATENT DOCUMENTS

| | | | | |
|---|---|---|---|---|
| 2,760,775 A * | 8/1956 | Tipton | .......................... | 264/515 |
| 3,299,501 A * | 1/1967 | Cox | .......................... | 264/515 |
| 4,396,562 A * | 8/1983 | Heaume | ........................ | 264/23 |
| 4,719,072 A * | 1/1988 | Kojima et al. | ............... | 264/515 |
| 4,952,347 A * | 8/1990 | Kasugi | ...................... | 264/516 X |
| 5,308,427 A * | 5/1994 | Duhaime et al. | ........... | 156/245 |
| 5,308,573 A * | 5/1994 | Hirakawa | .................... | 264/516 |
| 5,326,514 A * | 7/1994 | Linden et al. | ........... | 264/516 X |
| 5,344,038 A * | 9/1994 | Freeman et al. | ............. | 220/453 |
| 5,445,783 A * | 8/1995 | Irish et al. | ................... | 264/515 |
| 5,514,323 A * | 5/1996 | Ramioulle | ................... | 264/516 |
| 5,891,385 A * | 4/1999 | Cerbelle et al. | ............. | 264/515 |
| 6,071,370 A * | 6/2000 | Stiles | ...................... | 264/516 X |
| 6,092,425 A * | 7/2000 | Kuznia et al. | ................. | 73/726 |
| 6,293,420 B1 * | 9/2001 | Richter et al. | ............... | 220/563 |

FOREIGN PATENT DOCUMENTS

| | | |
|---|---|---|
| DE | 42 21 766 A1 | 1/1993 |
| DE | 42 05 332 A1 | 8/1993 |
| FR | 2 109 489 | 5/1972 |
| GB | 2 186 229 A | 8/1987 |

* cited by examiner

*Primary Examiner*—Stephen J. Castellano
(74) *Attorney, Agent, or Firm*—Oliff & Berridge, PLC

(57) ABSTRACT

A method of making a tank out of blown, thermoformed, or rotomolded thermoplastic material, the method comprising the following steps:
  making a portion in relief on the inside of the tank, said portion in relief enabling an attachment to be mounted inside the tank and defining a permanent housing for receiving at least a portion of said attachment, the portion in relief being made:
either by implementing the following steps:
  a) placing at least one insert inside an enclosure;
  b) inserting the material that is to form the wall of the tank inside the enclosure; and
  c) forming the wall of the tank by blowing, thermoforming, or rotomolding, the insert being positioned inside the enclosure in such a manner that while the wall is being formed, it covers the insert at least in part, the insert also being of a shape that is selected in such a manner that said wall, by taking on at least part of the shape of the insert, constitutes said portion in relief;
or else by mounting a mounting member on the wall of the tank.

30 Claims, 3 Drawing Sheets

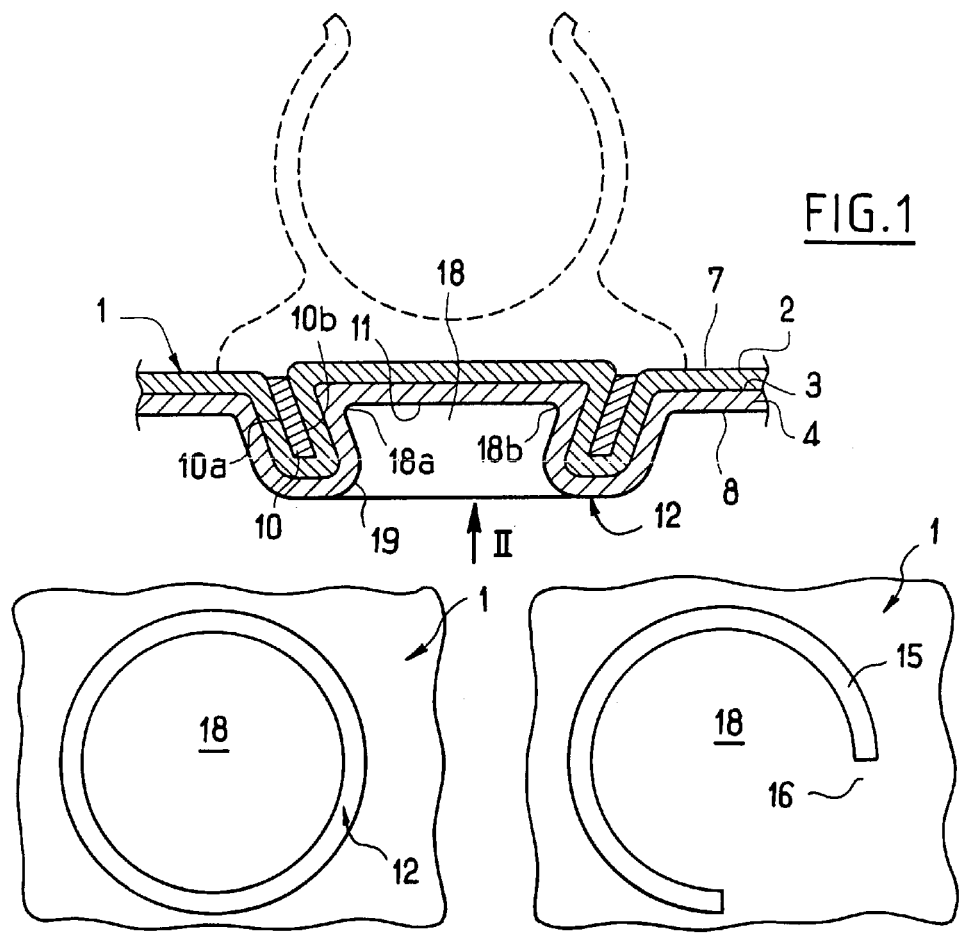
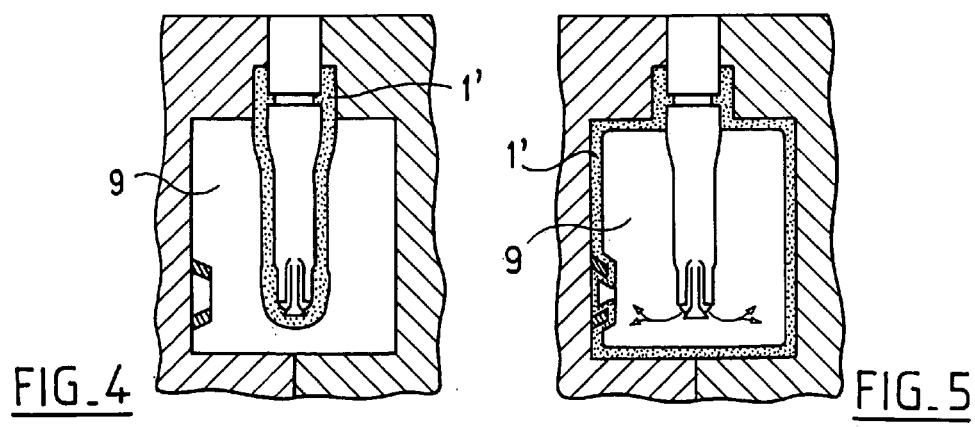

METHOD OF MANUFACTURING A TANK OF THERMOPLASTIC MATERIAL INCLUDING A PORTION IN RELIEF FOR MOUNTING AN ATTACHMENT, AND A TANK MANUFACTURED THEREBY

The present invention relates to a method of making a tank of blown, thermoformed, or rotomolded thermoplastic material.

More particularly, but not exclusively, the invention relates to making a fuel tank for a motor vehicle.

A fuel tank must be designed to prevent fuel being lost through its wall, in particular by diffusing through the thermoplastic material.

To do this, it is known that the tank can be made from a multilayer parison that includes a barrier-forming layer constituted by a material having good impermeability to hydrocarbons both in gaseous and in liquid form.

By way example, such a layer can be based on EVOH.

In general, a tank made in this way gives satisfaction concerning hydrocarbon emissions.

It is also necessary to be able to mount attachments such as a fuel pump, a valve, or a pipe, for example, on or in the tank without damaging its barrier-forming layer(s) and without compromising its impermeability of the tank to hydrocarbons.

U.S. Pat. No. 5,308,427 describes a method of mounting an attachment to the inside of a fuel tank. In that method, a mounting portion in relief is made on the wall of the tank by means of an insert, the parison then covering it during blowing. The attachment has an orifice into which the portion in relief is inserted. The attachment then projects into the inside of the attachment, thereby reducing the height available for performing the function for which the attachment, in particular a valve, is provided, and that can reduce the maximum depth of fuel that can be received by the tank, and thus reduce the capacity of the tank.

There exists a need to be able to mount an attachment, in particular a valve, to the inside surface of a tank and as close as possible thereto, for example in order to be able to increase the depth of fuel in the tank.

The invention seeks to satisfy the above needs in full or in part.

The invention achieves this by means of a method of making a tank out of blown, thermoformed, or rotomolded thermoplastic material, the method being characterized by the fact that it comprises the following steps:

making a portion in relief on the inside of the tank, said portion in relief enabling an attachment to be mounted inside the tank and defining a permanent housing for receiving at least a portion of said attachment, the portion in relief being made:

either by implementing the following steps:
  a) placing at least one insert inside an enclosure;
  b) inserting the material that is to form the wall of the tank inside the enclosure; and
  c) forming the wall of the tank by blowing, thermoforming, or rotomolding, the insert being positioned inside the enclosure in such a manner that while the wall is being formed, it covers the insert at least in part, the insert also being of a shape that is selected in such a manner that said wall, by taking on at least part of the shape of the insert, constitutes said portion in relief;

or else by mounting a mounting member on the wall of the tank.

The invention makes it possible to provide a shape for mounting an attachment inside the tank without any need to cut through or pierce through the wall of the tank, and this is particularly advantageous when the wall in question includes one or more layer(s) forming a barrier against hydrocarbons.

Means for mounting an attachment inside the tank are thus obtained in simple and reliable manner without the presence of such mounting means diminishing the leak-proofing of the tank against hydrocarbons.

The fact that the portion in relief defines a housing makes it possible to mount the attachment, in particular a valve, by engaging it inside the housing, without thereby losing useful height for the purpose of performing the function for which the attachment is provided, and thus without reducing the maximum depth of fuel the tank can accept.

The attachment need not be a valve, and in particular it could be constituted by a pipe, a filter, a pump, a fuel gauge, or any retaining member.

The portion in relief can be made on the top wall of the tank.

When the portion in relief is made by attaching a mounting member to the wall of the tank, it is possible to have greater freedom in the choice of location for the mounting member than when an insert is overmolded.

When the housing has an end wall, the attachment can come into contact with said end wall after it has been mounted.

In a particular embodiment, the housing is defined inside an annular wall which can be interrupted or continuous.

In a variant, the portion in relief can be in the form of two tabs, the housing being defined between the tabs.

In a particular embodiment, the attachment is put into place inside the housing in an axial direction thereof, which direction can be vertical.

The portion in relief can be of a shape chosen to enable the attachment to be secured to the wall of the tank by snap-fastening.

In a variant, the portion in relief can be of a shape selected to enable the attachment to be held to the wall of the tank by friction.

In both cases, the portion in relief makes it easy to put the attachment into place.

When the portion in relief is made by implementing steps a) to c), the wall of the tank is advantageously made by blowing a parison placed inside the enclosure.

When implementing steps a) to c), step a) can precede step b), or vice-versa.

The shape of the insert can be selected in such a manner as to constitute reinforcement within the wall of the tank, thereby limiting variations in the dimensions of the tank wall.

The overmolded portion of the insert advantageously presents a shape that is selected in such a manner as to guarantee effective retention in the wall of the tank.

Thus, in a particular embodiment, the overmolded portion of the insert has two opposite faces that converge towards the outside of the tank.

In another particular embodiment, the overmolded portion of the insert is annular in shape, having a radially inner surface that diverges towards the outside of the tank.

Advantageously, the insert is in the form of an interrupted annulus, thus making it possible both to mount an attachment and also to hold it in a predetermined angular position.

Such a shape serves, in particular, to hold an attachment in a predetermined position when the attachment includes an endpiece suitable for engaging in the passage formed by the interrupted portion of the insert.

The insert can be kept inside the enclosure while the wall is being formed so that the outside surface of the tank presents a setback in register with the insert. This avoids forming a bulge on the outside wall of the tank which would run the risk of increasing its overall outside dimensions.

The insert is preferably made of a material having a melting temperature that is higher than that of the material(s) constituting the parison.

Nevertheless, the insert does not need to be made of a material that is impermeable to hydrocarbons since it is protected by the barrier-forming layer.

In a particular embodiment, the insert is made of a polyolefin, in particular high-density polyethylene.

In another particular embodiment, the insert is made of metal.

After being overmolded, the insert is held captive in the wall of the tank.

In another implementation invention, the portion in relief is made by applying a mounting member to the wall of the tank by heat-sealing. In which case, the attachment can have elastically deformable tabs suitable for going past an annular bead of the mounting member by elastic deformation.

Advantageously, the parison has at least one layer of thermoplastic material and a layer that forms a barrier against hydrocarbons.

In a preferred embodiment, the parison has two layers of thermoplastic material, with a layer forming a barrier against hydrocarbons sandwiched between them. The outer layers thus protect the barrier-forming layer against mechanical damage.

The tank can be subjected to treatment for forming a barrier against hydrocarbons, in particular treatment by fluorination.

The invention also provides an insert for implementing the above-specified method.

The invention also provides a fuel tank comprising a wall of blown thermoplastic material overmolded on at least one insert, the wall covering the insert defining a portion in relief that enables an attachment to be mounted to the body of the tank, said portion in relief including a housing suitable for receiving at least a portion of the attachment.

The invention also provides a fuel tank comprising a wall of thermoplastic material rotomolded on at least one insert, the wall covering the insert defining a portion in relief enabling an attachment to the mounted to the body of the tank, said portion in relief including a housing suitable for receiving at least a portion of the attachment.

The invention also provides a fuel tank comprising a wall of thermoplastic material thermoformed on at least one insert, the wall covering the insert defining a portion in relief enabling an attachment to the mounted to the body of the tank, said portion in relief including a housing suitable for receiving at least a portion of the attachment.

The invention also provides a method of making a tank of blown, thermoformed, or rotomolded thermoplastic material, the method comprising the following steps:

making a portion in relief on the inside of the tank, said portion in relief enabling an attachment to be mounted inside that tank, the portion in relief being made:

either by implementing the following steps:
a) placing at least one insert inside an enclosure;
b) inserting the material that is to form the wall of the tank inside the enclosure; and c) forming the wall of the tank by blowing, thermoforming, or rotomolding, the insert being positioned inside the enclosure in such a manner that while the wall is being formed, it covers the insert at least in part, the insert also being of a shape that is selected in such a manner that said wall, by taking on at least part of the shape of the insert, constitutes said portion in relief;

or else by mounting a mounting member on the wall of the tank, the wall of the tank comprising at least a layer of thermoplastic material and a layer that forms a barrier against hydrocarbons. The portion in relief can then be of the male or of the female type, optionally including a housing.

Other characteristics and advantages of the present invention will appear on reading the following detailed description of non-limiting embodiments, and on examining the accompanying drawings, in which:

FIG. 1 is a fragmentary diagrammatic section view of a tank wall including an insert constituting a first embodiment of invention;

FIG. 2 is a diagrammatic face view seen along arrow II of FIG. 1;

FIG. 3 is a view analogous FIG. 2 showing a second embodiment of invention;

FIGS. 4 and 5 are diagrams showing two steps in blowing a tank wall inside an enclosure having an insert placed therein;

FIG. 1 shows a portion of the wall 1 of the body of a motor vehicle fuel tank.

Figure 6A:
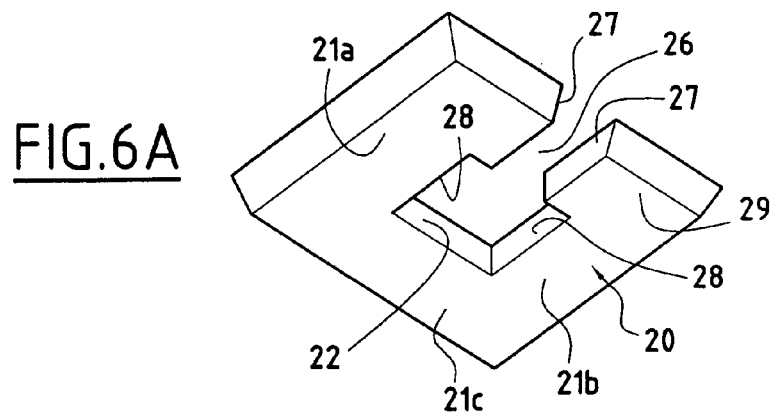
FIGS. 6A and 6B are two diagrammatic perspective views of a third embodiment of the invention.

This wall 1 has a multi-layer structure, comprising in succession: an outer layer 2 which defines practically the entire outside face 7 of the tank (and made of polyethylene in this example); an intermediate layer 3 forming a barrier against hydrocarbons (and made of EVOH in this example; and an inner layer 4 defining the inside face 8 of the tank (and made of polyethylene in this example).

In the embodiment described, the multi-layer structure includes a layer of adhesive between each inner or outer layer 4 or 2 and the intermediate layer 3 in order to improve the cohesion of the tank as a whole.

In this embodiment, an annularly shaped insert 10 is integrated in the wall 1 of the tank.

The insert 10 it used for providing mounting means 12 defining a housing 18 inside the tank and having an opening 19 of smaller diameter than its end wall 11.

The housing 18 is designed to receive a mounting member of the male type (not shown), capable of deforming elastically so as to pass through the opening 19 before engaging in the grooves 18a and 18b formed between the opening 19 and the end wall 11.

The insert 10 has a radially outer face 10a which is frustoconical, converging towards the inside of the tank, and a radially inner face 10b parallel thereto.

The insert 10 is set back a little from the outside face 7 of the wall 1, as can be seen in FIG. 1.

The converging shape of the radially inner face 10b provides effective retention of the insert 10 within the wall 1.

The insert 10 thus constitutes reinforcement which opposes any variation in the dimensions of the housing 18, thereby improving the reliability with which the attachment inserted into said housing 18 is mounted.

In the embodiment of FIGS. 1 and 2, the insert 10 is in the form of a continuous annulus.

It can be advantageous to use an insert that is in the form of an interrupted annulus, thereby constituting mounting means 15 of the kind shown in FIG. 3, having a passage 16 that enables an attachment placed in the housing 18 to be indexed in rotation.

In other words, the attachment can be mounted inside the tank in a predetermined angular orientation.

The way in which the insert 10 is integrated in the wall 1 of the tank is described in outline below with reference to FIGS. 4 and 5.

The body of the tank is made in conventional manner by blowing a parison 1' inserted into an enclosure 9.

The parison 1' has the same multi-layer structure as the wall 1.

As shown in FIG. 4, the insert 10 is put inside the enclosure 9 and is held against its wall prior to blowing the parison 1', using holding means (not shown).

While the parison 1' is being blown, the wall 1 of the tank takes on its shape and presses itself against the wall of the enclosure 9, as can be seen in FIG. 5.

The wall 1 that results from the blowing is pressed against the insert 10 and follows substantially the same outline, so as to lead to the configuration shown in FIG. 1.

It should be observed at that during blowing, the integrity of the barrier-forming intermediate layer 3 is conserved.

The insert is not limited to a circular annular shape, and it can have a non-circular annular shape, or indeed any other shape.

FIG. 6A shows an insert 20 that is generally U-shaped having two parallel rectilinear branches 21a and 21b whose ends 27 are angled towards each other.

The base 21c of the U-shape is perpendicular to the branches 21a and 21b.

The ends 27 leave a passage 26 between them.

The facing faces 28 of the branches 21a and 21b converge going away from the visible main face 29 of the insert 20.

The periphery of the insert 20 is chamfered so as to form a slope that makes it possible, while the wall 1 of the tank is being pressed against the insert 20 during blowing, to ensure that the various layers making up the wall are not subjected to excessive stress because of a radius of curvature that is too sharp.

Figure 6B:
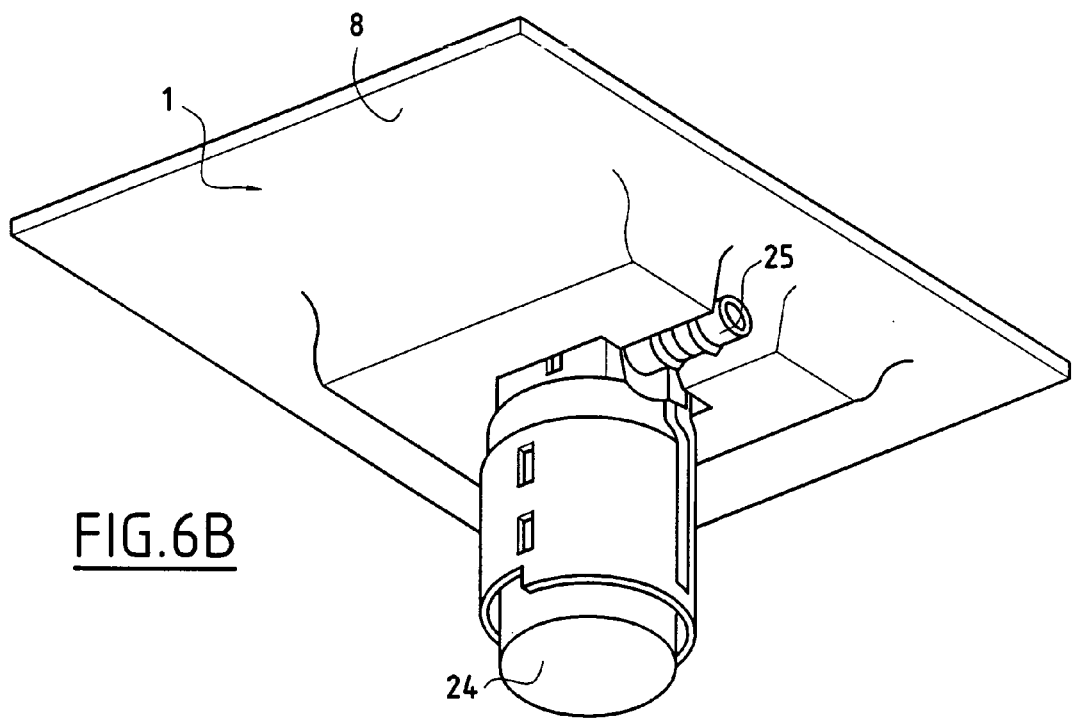

FIG. 6B shows the wall 1 after it has been overmolded onto the insert 20.

The space in the middle of the insert between the branches 21a, 21b, and 21c defines a housing into which mounting means for a valve 24 of a fuel system are snap-fastened, where the portion of the wall that is shown is at the top of the tank.

The valve 24 has a pipe 25 which engages in the gap formed between the ends 27.

By means of its shape, the insert 20 constitutes reinforcement which tends to oppose any variation in the dimensions of the wall 1 covering it, thereby reducing the risk of the valve 24 becoming accidentally detached.

Naturally, the invention is not limited to the embodiments described above.

Figure 7:
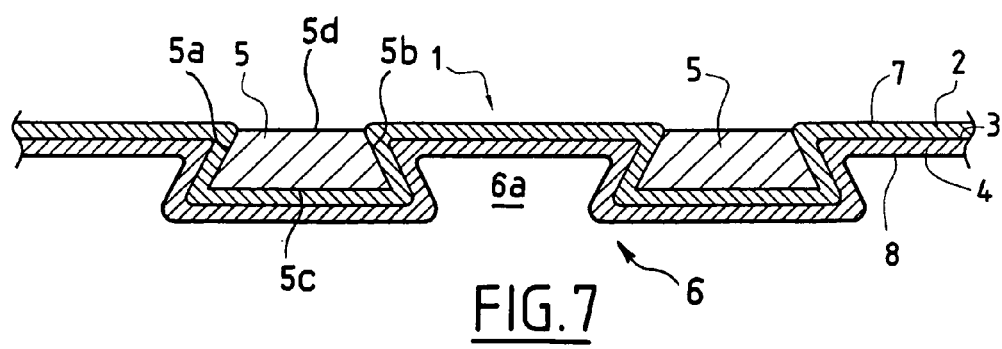
FIG. 7 is a fragmentary a diagrammatic section view of the tank wall including an insert constituting a fourth embodiment of the invention.

FIG. 7 shows mounting means forming two tabs, made by overmolding two inserts 5 that are placed side by side.

In the section plane of FIG. 7, each insert 5 has a cross-section that is trapezoidal in shape, with two opposite side faces 5a and 5b which correspond to the short sides of the trapezoid and which converge towards the outside of the tank.

The face 5c corresponding to the long face of the trapezoid faces towards the inside of the tank.

The opposite face 5d of the insert 5 looks to the outside of the tank.

It can be seen in FIG. 7 that the wall 1 covers the faces 5a to 5c of the inserts 5 and constitutes mounting means 6.

The mounting means 6 comprise a housing 6a defined by the gap between the two inserts 5 and intended to receive a portion of an attachment.

In a variant, two parallel mounting slideways can be made that define between them a housing that is suitable for receiving a portion of the attachment.

The attachment can then be put into place by being slid along the direction parallel to the slideways.

It is possible to use an insert not only to constitute fastening means inside the tank, but also to form fastening means outside the tank.

By way example, dashed lines in FIG. 1 show an extension of the insert 1 for constituting a collar that can be used on the outside face of the tank to hold a pipe.

The invention is not limited to forming the wall of a tank by blowing.

The tank can also be made by rotomolding.

It is also possible to make the tank by thermoforming, e.g. by vacuum forming, thereby providing two half-shells that are subsequently assembled together.

The embodiments described above relate to making mounting means by overmolding an insert.

It would not go beyond the ambit of the present invention to make mounting means by fitting a mounting member to the wall of the tank, in which case the mounting member is not coated in the wall material.

Figure 8:
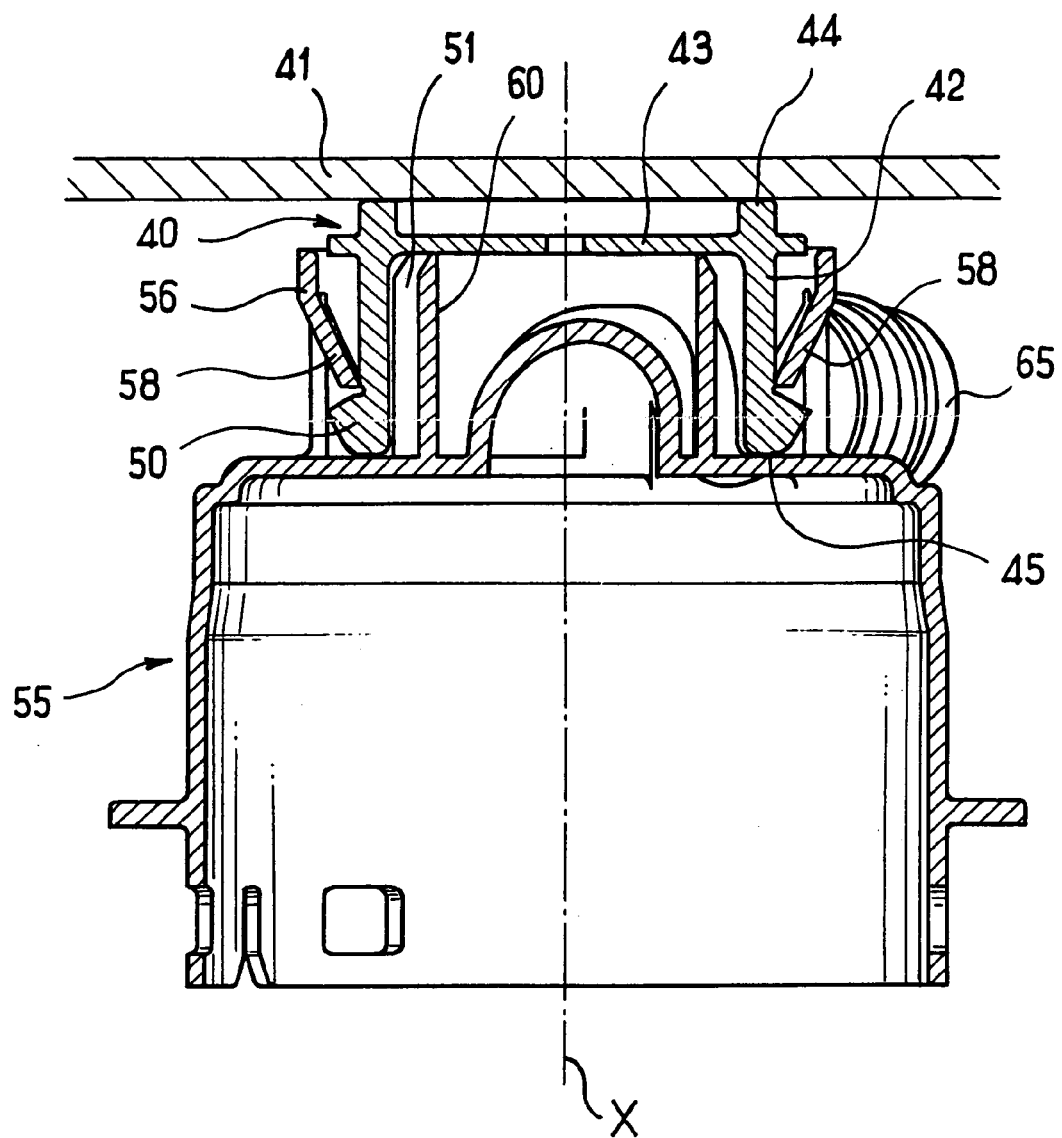
FIG. 8 is a fragmentary and diagrammatic axial section view of a mounting member of invention fitted to the tank wall and having an attachment mounted thereto and shown in part.

FIG. 8 shows such a mounting member 40, secured to the wall of the tank 41 by heat-sealing.

In the embodiment described, the wall 41 comprises a single-layer structure made of polyethylene.

The mounting member 14 has a cylindrical tubular wall 42 about an axis X, and a transverse wall 43 situated at quite a short distance from an axial end 44 of the tubular wall 42.

The top end 44 of the mounting member 40 is heat-sealed to the tank wall 41.

At its bottom end 45, the tubular wall 42 has an annular bead 50 that is directed radially outwards.

Together, the tubular wall 42 and the transverse wall 43 define a downwardly open housing 51 suitable for receiving the top portion of an attachment 55 which is constituted in this example by a valve represented solely by its outer skirt 56 about the axis X and by elastically deformable tabs 58. The tabs bear against the bead 50.

The valve 55 also has an inner skirt 60, likewise on the axis X, and engaged in the tubular wall 42 so as to bear against the transverse wall 43.

The valve 55 is provided with a coupling endpiece 65 that extends sideways, passing through the inner and outer skirts 60 and 56.

The valve 55 is put into place on the safety member 40 by snap-fastening along the axis X, the tabs 58 deforming elastically to go past the bead 50.

The invention claimed is:

1. A fuel tank comprising:
    an insert having a form that defines a recessed opening;
    a wall of thermoplastic material, a portion of the outside surface of the wall being overmolded on and in direct contact with the insert, which does not pierce through the wall, the overmolded wall portion covering the recessed opening of the insert to form a portion in relief, on the inside of the tank, that defines an internal housing; and
    an attachment separate from the insert attached to the portion in relief and at least partially received in the housing inside the tank,
    wherein the insert is made of a material having a melting temperature that is higher than that of the thermoplastic material of the wall and has a form enabling mounting of the attachment in the formed internal housing.

2. A fuel tank according to claim 1, wherein the attachment is selected from the group consisting of a pipe, a filter, a pump, a fuel gauge, and a support member.

3. A fuel tank according to claim 1, wherein the attachment is a valve.

4. A fuel tank according to claim 1, wherein the portion in relief is made on a top of the wall of the tank.

5. A fuel tank according to claim 1, wherein the housing has an end wall, and the attachment comes into contact with the end wall once it has been mounted.

6. A fuel tank according to claim 1, wherein the housing is formed inside an annular wall.

7. A fuel tank according to claim 6, wherein the annular wall is interrupted.

8. A fuel tank according to claim 6, wherein the annular wall is continuous.

9. A fuel tank according to claim 1, wherein the portion in relief comprises two tabs, the housing being formed between the tabs.

10. A fuel tank according to claim 1, wherein the attachment is mounted in the housing along an axial direction thereof.

11. A fuel tank according to claim 1, wherein the portion in relief has a shape selected to enable the attachment to be mounted by snap-fastening.

12. A fuel tank according to claim 1, wherein the portion in relief has a shape selected to enable the attachment to be held by friction to the wall of the tank.

13. A fuel tank according to claim 1, wherein a shape of the insert is configured to reinforce the wall of the tank, limiting variations in dimensions thereof.

14. A fuel tank according to claim 1, wherein the overmolded portion of the insert has a shape configured to guarantee effective retention in the wall of the tank.

15. A fuel tank according to claim 1, wherein the portion in relief has an annular shape with a radially inner surface that diverges towards an outside of the tank.

16. A fuel tank according to claim 1, wherein the insert comprises a polyolefin.

17. A fuel tank according to claim 1, wherein the insert comprises a metal.

18. A fuel tank according to claim 1, wherein the insert comprises a high-density polyethylene.

19. A fuel tank according to claim 1, wherein the wall of the tank comprises at least one layer of thermoplastic material and a layer that forms a barrier against hydrocarbons.

20. A fuel tank according to claim 1, wherein the wall has two layers of thermoplastic material and, sandwiched between them, a layer forming a barrier against hydrocarbons.

21. A fuel tank according to claim 1, wherein the wall of the tank has received a treatment for forming a barrier against hydrocarbons.

22. A fuel tank according to claim 21, wherein the wall of the tank has received a treatment by fluorination.

23. A fuel tank according to claim 1, wherein the wall of the fuel tank is blow molded.

24. A fuel tank according to claim 1, wherein the wall of the fuel tank is rotomolded.

25. A fuel tank according to claim 1, wherein the wall of the fuel tank is thermoformed.

26. The fuel tank according to claim 1, wherein the covering portion forming the portion in relief has at least one interior peripheral wall surface that diverges toward an outside of the tank to enable mounting of the attachment.

27. A fuel tank comprising:
    at least one insert having a form that defines a recessed opening;
    a wall of thermoplastic material, the wall having the outside surface of at least one portion covering and in direct contact with the insert, the covering portion forming a portion in relief defining an internal housing covering the recessed opening of the insert; and
    an attachment separate from the insert attached to the portion in relief and at least partially received in the housing and situated at least partially inside the fuel tank and not in contact with the insert,
    wherein the insert is made of a material having a melting temperature that is higher than that of the thermoplastic material of the wall and has a form enabling mounting of the attachment in the formed internal housing.

28. The fuel tank according to claim 27, wherein the covering portion forming the portion in relief has at least one interior peripheral wall surface that diverges toward an outside of the tank to enable mounting of the attachment.

29. The fuel tank according to claim 27, wherein the portion in relief has a shape selected to enable the attachment to be mounted by snap-fastening.

30. The fuel tank according to claim 27, wherein the portion in relief has a shape selected to enable the attachment to be held by friction to the wall of the tank.

* * * * *